L. LIAIS.
COVER FOR PNEUMATIC TIRES.
APPLICATION FILED SEPT. 21, 1910.

1,023,666.

Patented Apr. 16, 1912.

Witnesses:

Inventor
Lucien Liais

UNITED STATES PATENT OFFICE.

LUCIEN LIAIS, OF PARIS, FRANCE.

COVER FOR PNEUMATIC TIRES.

1,023,666.  Specification of Letters Patent.  Patented Apr. 16, 1912.

Application filed September 21, 1910. Serial No. 583,052.

*To all whom it may concern:*

Be it known that I, LUCIEN LIAIS, engineer, a citizen of the French Republic, residing at 129bis Rue de la Pompe, Paris, France, have invented certain new and useful Improvements in Covers for Pneumatic Tires, of which the following is a specification.

Heretofore pneumatic tires of that type which are provided with an internal backing or lining of canvas or equivalent material have been liable to burst for the reason that their construction prevents them from efficiently resisting stresses tending to cause them to burst.

The object of the present invention is to overcome this disadvantage.

The invention is based on my observation that the disadvantage in question is due to the fact that the lining or backing in tires of ordinary construction is always, during use, in a state of extreme tension closely approaching the breaking stress, the result being that at the least shock the fabric breaks and a break at any point or points quickly spreads throughout the extent of the tire.

The construction herein proposed embodies bolsters or cushions which extend peripherally of the tire and are arranged at the convex part of the tread, their purpose being to tension the backing or lining previous to inflation and to prevent the tension from being increased to a material extent consequent to inflation.

Embodiments of the invention are illustrated in the accompanying drawings, wherein—

Figure 1:
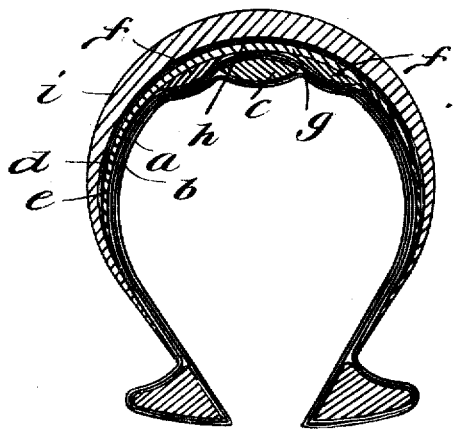
Figure 2:
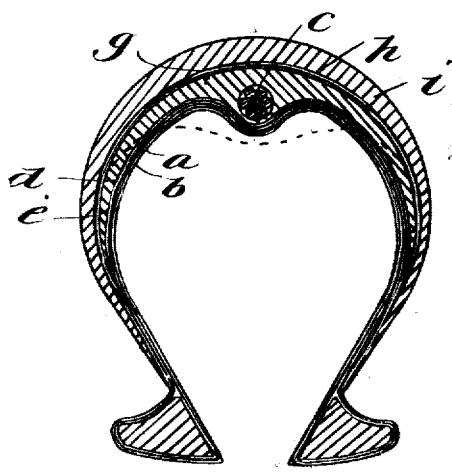

Figure 1 is a cross section of the preferred form and Fig. 2 is a cross section of a slightly modified form.

Referring to Fig. 1 the tire cover includes preferably an internal lining or backing made of four layers of suitable material, e. g. canvas; $a$, $b$, $d$ and $e$. The layers $a$, $b$ are separated from the layers $d$, $e$ by the bolster $c$ which extends peripherally of the cover and is arranged longitudinally central of the latter, the said bolster having a double convex cross section. The canvas layers aforesaid are inclosed by a tread crescent $g$ preferably of rubber between which and the internal backing or lining bolsters $f$ are arranged. The bolsters $f$ are generally similar to the bolster $c$ and are disposed at each side of the latter, their purpose being to coact with the bolster $c$ in putting an initial tension on the canvas backing or lining and to cause the latter to have an irregularly curved cross section. The other elements of the cover are a tread canvas $h$ which incloses the rubber tread crescent $g$ and an outer tread $i$ which is also preferably of rubber. Fig. 1 illustrates the condition of the cover and the relation of its parts prior to fitting the same upon the rim. Assuming that the cover has been fitted and that the inner tube is being inflated, the pressure acts on the lining to produce an increased tensioning thereof with the result that there is merely a slight diminution of the convexity of the bolsters $c$ and $f$. These bolsters nevertheless retain their general shape and the canvas layers, while still maintained under an efficient tension, are by no means tensioned to a degree which approaches the breaking point. In the event of a shock to the tire, the only result is that there will be a still further diminution of the convexity of the bolsters and a corresponding increase of the tension of the canvas layers, which tension nevertheless will under all conditions practically encountered be materially less than the breaking tension, and the irregularity of the curved cross section of the layers will still be maintained.

The construction shown in Fig. 2 differs in no way in its essential principles from the construction shown in Fig. 1, the departure concerning the details of organization. In this case the bolsters $f$ are not employed and the bolster $c$ instead of being interposed between the canvas layers $a$, $b$ and $d$, $e$, is embedded in a central internally ribbed or thickened portion of the tread crescent $g$ so as to produce a corresponding deformation of the cross section of the canvas backing or lining. In this construction the bolster $c$ instead of having a double convex, has a circular cross section and consists preferably of a twisted cotton cable having its ends joined in a suitable manner.

The effect obtained by the construction shown in Fig. 2 is similar to the effect obtained by the construction shown in Fig. 1. The deformation of the canvas backing or lining is originally of such extent that it enables said backing or lining to have a continuous irregular curve under all degrees of compression or shock which are practically encountered.

It is understood that the word "crescent"

as applied to certain of the parts in the following claims is to be given a strict construction.

Having fully described my invention, I claim:

1. A pneumatic tire comprising an outer covering having a crescent-shaped tread portion, an internal backing formed of a number of superposed fabric layers arranged to lie against the inner face of the cover but not embedded therein, and a circumferentially disposed bolster of substantial thickness and of separate material from the tire, the bolster being arranged symmetrically at the thickened part of the tread of the cover and adjacent the inner face thereof, the bolster being formed and proportioned to provide an annular convex rib which bears against said backing and acts thereon to produce an original tensioning thereof and causes said backing to have an irregular and symmetrically curved cross-section, as and for the purpose set forth.

2. A pneumatic tire comprising an outer cover having a crescent-shaped tread portion, an internal backing formed of a number of superposed fabric layers and peripherally extending bolsters arranged symmetrically with respect to one another, said bolsters placing the backing in tension before inflation and at the same time causing the backing to have an original irregularly curved cross section, the central bolster being arranged between the intermediate fabric layers and the other bolsters being arranged between the backing and the adjacent portions of the cover.

3. A pneumatic tire comprising an outer covering having a crescent-shaped tread portion, an internal backing formed of a number of superposed fabric layers arranged to bear against the inner face of the cover but not embedded therein, and a peripherally extending bolster arranged symmetrically with respect to the cover and to the backing and bearing directly against the latter, said bolster placing the backing in tension and at the same time causing the backing to have an original, irregularly curved cross-section.

In testimony whereof I have hereunto set my hand in presence of two subscribing witnesses.

LUCIEN LIAIS.

Witnesses:
H. C. COXE,
HENRY ROLLET.